United States Patent
Hunter et al.

(10) Patent No.: US 7,142,818 B2
(45) Date of Patent: Nov. 28, 2006

(54) SYSTEMS AND METHODS FOR REDUCING RADIO RECEIVER INTERFERENCE FROM AN ON-BOARD AVIONICS TRANSMITTER

(75) Inventors: Jeffrey K. Hunter, Olathe, KS (US); Manuel F. Richey, Paola, KS (US); Timothy P. Gibson, Shawnee, KS (US)

(73) Assignee: Honeywell International, Inc., Morristown, NJ (US)

( * ) Notice: Subject to any disclaimer, the term of this patent is extended or adjusted under 35 U.S.C. 154(b) by 481 days.

(21) Appl. No.: 10/365,807

(22) Filed: Feb. 13, 2003

(65) Prior Publication Data

US 2004/0176034 A1  Sep. 9, 2004

(51) Int. Cl.
*H04B 1/10* (2006.01)
*H04B 15/00* (2006.01)

(52) U.S. Cl. .................. 455/63.1; 455/263; 455/212; 455/265; 455/208; 455/132; 455/195.1; 455/260; 375/267; 375/326; 375/344; 375/347

(58) Field of Classification Search .............. 455/131, 455/212, 208, 264, 265, 260; 375/267, 326, 375/344, 347; 381/15
See application file for complete search history.

(56) References Cited

U.S. PATENT DOCUMENTS

| | | | |
|---|---|---|---|
| 5,424,674 A | 6/1995 | Skudera, Jr. et al. | |
| 5,467,399 A * | 11/1995 | Whitecar | 381/4 |
| 5,822,366 A * | 10/1998 | Rapeli | 375/219 |
| 5,898,907 A * | 4/1999 | Maruyama | 455/76 |
| 5,930,310 A * | 7/1999 | Freeman | 375/346 |
| 5,930,682 A * | 7/1999 | Schwartz et al. | 455/14 |
| 6,075,808 A * | 6/2000 | Tsujimoto | 375/143 |
| 6,185,434 B1 * | 2/2001 | Hagstrom et al. | 455/552.1 |
| 6,384,681 B1 * | 5/2002 | Bonds | 330/149 |
| 6,473,596 B1 * | 10/2002 | Stamper et al. | 455/63.1 |
| 6,480,555 B1 * | 11/2002 | Renard et al. | 375/340 |
| 2002/0173341 A1 | 11/2002 | Abdelmonem et al. | |

* cited by examiner

*Primary Examiner*—Marceau Milord
(74) *Attorney, Agent, or Firm*—Ingrassia Fisher & Lorenz

(57) ABSTRACT

Systems and methods for reducing interference in an enhanced radio receiver from a transmitter when both are located in the same aircraft are provided. The enhanced radio receiver detects and attenuates a signal from the transmitter, without attenuation or interference with other desired signals. An enhanced radio transmitter may inform the enhanced radio receiver of the frequency of transmission via a data communication path such that the enhanced radio receiver attenuates the transmitted frequency for the duration of transmission.

20 Claims, 8 Drawing Sheets

SYSTEMS AND METHODS FOR REDUCING RADIO RECEIVER INTERFERENCE FROM AN ON-BOARD AVIONICS TRANSMITTER

BACKGROUND OF THE INVENTION

A radio receiver is sensitive to radio signals in its operational frequency band. The operational frequency band is typically divided into a plurality of channels, the channels being non-overlapping within the operational frequency band. Nonetheless, a transmitted signal from a radio transmitter located in the same aircraft as the radio receiver interferes with the radio receiver, even when it uses different channels. Specifically, the transmitted signal is received by the radio receiver at high signal strength due to close proximity to the radio transmitter. This causes interference that distorts or blocks reception in the radio receiver. To reduce this interference, the prior art connects the radio transmitter and radio receiver by a control line that is activated by the radio transmitter to desensitize the radio receiver for the duration of a transmitted signal. The radio receiver is thus desensitized across its entire operational frequency band, reducing receiver performance but not preventing interference. Often, the interference and degraded radio receiver performance is unacceptable to a pilot.

In another technique of the prior art, the radio receiver attempts to reduce interference from the radio transmitter by utilizing narrow band-pass filters tuned to frequencies for a selected channel. This technique, however, prevents reception and output of multiple channels simultaneously, a desirable feature of modern radio receivers.

SUMMARY OF THE INVENTION

In one aspect, an enhanced aircraft radio receiver identifies a strong signal as transmitted from an on-board radio transmitter. The enhanced radio receiver attenuates the strong signal without attenuating signals received in other channels, thus reducing interference while maintaining sensitivity.

In another aspect, the enhanced radio receiver connects to the radio transmitter by a control signal activated by the radio transmitter during an on-board transmission. When the control line is active, the enhanced radio receiver attenuates frequencies in its operational frequency band, and then identifies and further attenuates the on-board transmission. The ability of the enhanced radio receiver to resist interference is thereby maximized and superior to a prior art radio receiver.

In yet another aspect, the enhanced radio receiver connects to an enhanced radio transmitter by a data communication path. When the enhanced radio transmitter begins transmission, it communicates the frequency of the transmission to the enhanced radio receiver via the data communication path. The enhanced radio receiver attenuates signals received at the transmission frequency until the enhanced radio transmitter communicates that the transmission has ended.

In yet another aspect, an enhanced radio transmitter connects to the enhanced radio receiver by a data communication path. When the enhanced radio transmitter transmits an on-board signal, it communicates the frequency of the on-board signal to the enhanced radio receiver via the data communication path. The enhanced radio receiver attenuates frequencies in its operational frequency band, and further attenuates signals received at the communicated frequency until the enhanced radio transmitter communicates that the on-board transmission has terminated. The ability of the enhanced radio receiver to resist interference is thereby maximized and superior to a prior art radio receiver.

DETAILED DESCRIPTION OF THE PREFERRED EMBODIMENTS

The prior art radio receiver has an operational frequency band that is divided into a plurality of channels. These channels are non-overlapping and equally spaced within the operational frequency band. A pilot tunes the radio receiver to one channel, and the radio receiver outputs a signal received on that channel. The prior art radio transmitter has the same operational frequency band as the radio receiver, divided into like channels. A pilot selects a channel on the radio transmitter on which signals are transmitted.

Transmissions from a radio transmitter located in an aircraft interfere with radio receivers located in the same aircraft, even when the radio transmitter and radio receiver are operating on different channels. Signals transmitted by the radio transmitter are received by the radio receiver at high signal strength due to close proximity of the radio receiver to the radio transmitter. This interference may distort or completely block reception of signals in the radio receiver.

It should be noted that both the radio transmitter and radio receiver may be radio transceivers, but for the purposes of clarity in this description, one will be designated the radio transmitter and the other designated the radio receiver.

Figure 1:
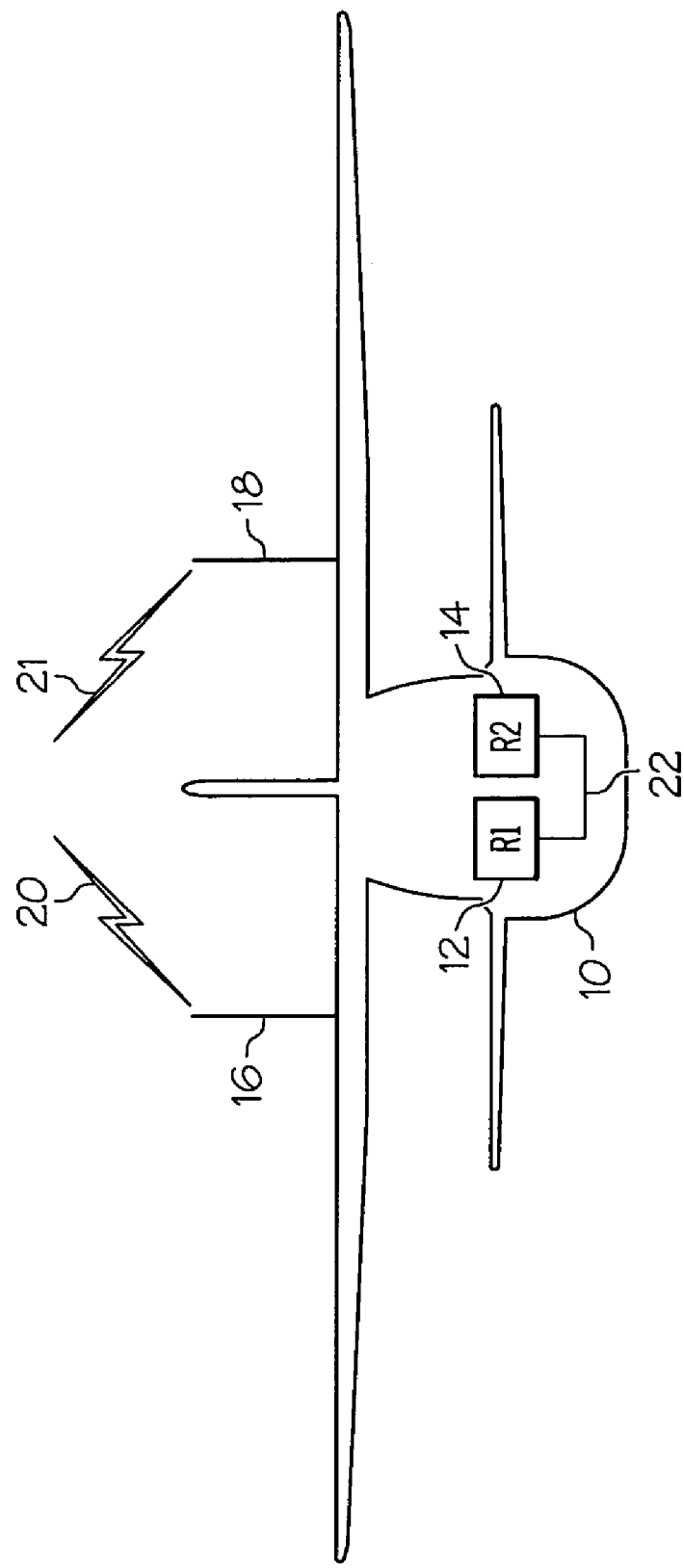
FIG. 1 illustrates an aircraft fitted with a prior art radio transmitter and radio receiver.

FIG. 1 illustrates an aircraft 10 fitted with a prior art radio transmitter 12 and a prior art radio receiver 14. Radio transmitter 12 transmits radio signal 20 using antenna 16. Radio 14 receives radio signal 21 using antenna 18. Signal 20 is received by antenna 18 at high signal strength due to the close proximity of antenna 18 to antenna 16. Optionally, radio transmitter 12 and radio receiver 14 may be connected together by data communication path 22. Data communication path 22 is a single control line that is used by radio transmitter 12 to notify radio receiver 14 of transmission 20. Radio receiver 14 may attenuate all frequencies in its operational frequency band when notified of the transmission, via data path 22, in order to reduce interference.

Figure 2:
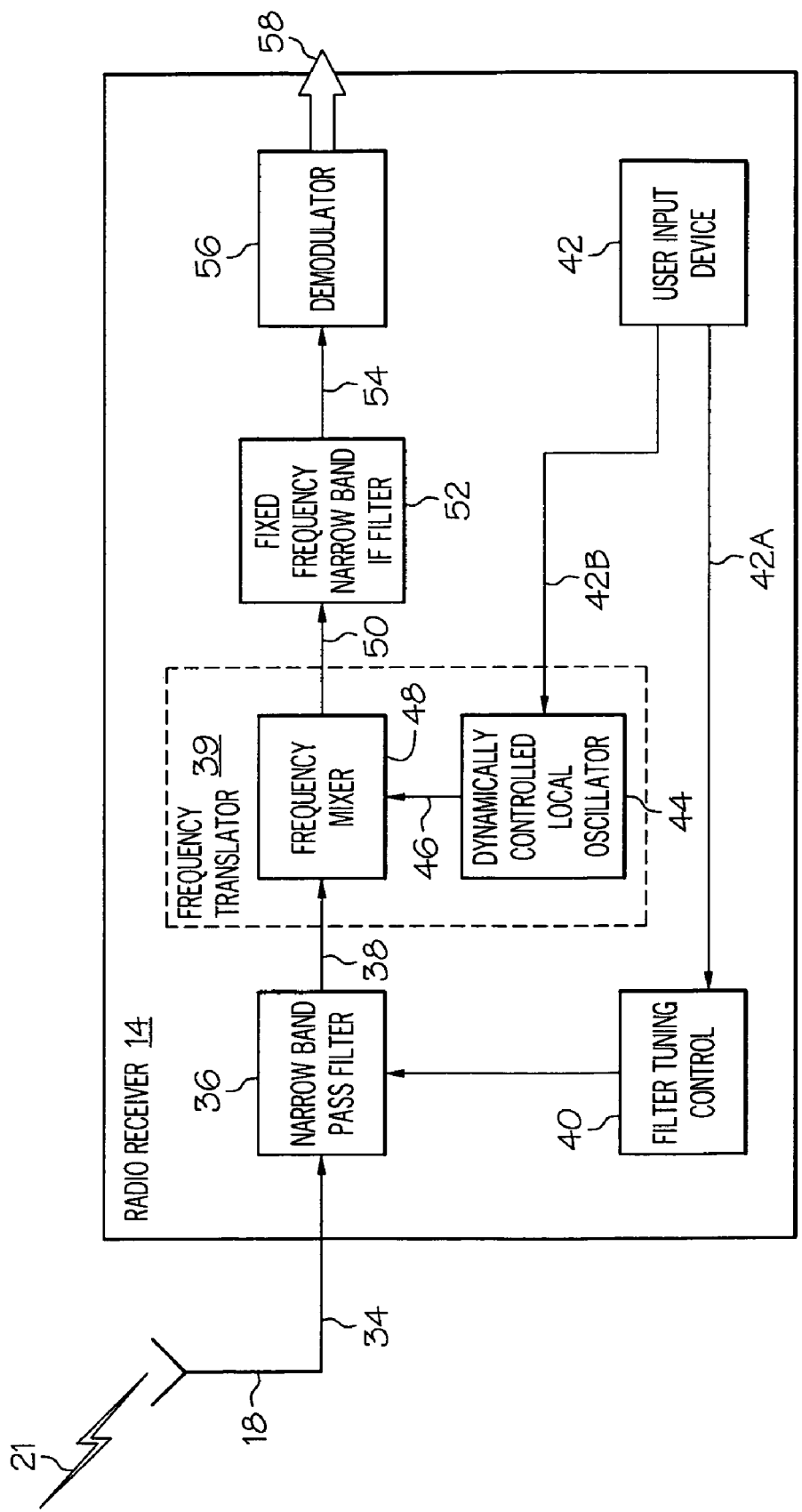
FIG. 2 is a block diagram illustrating the radio receiver of FIG. 1.
Figure 3:
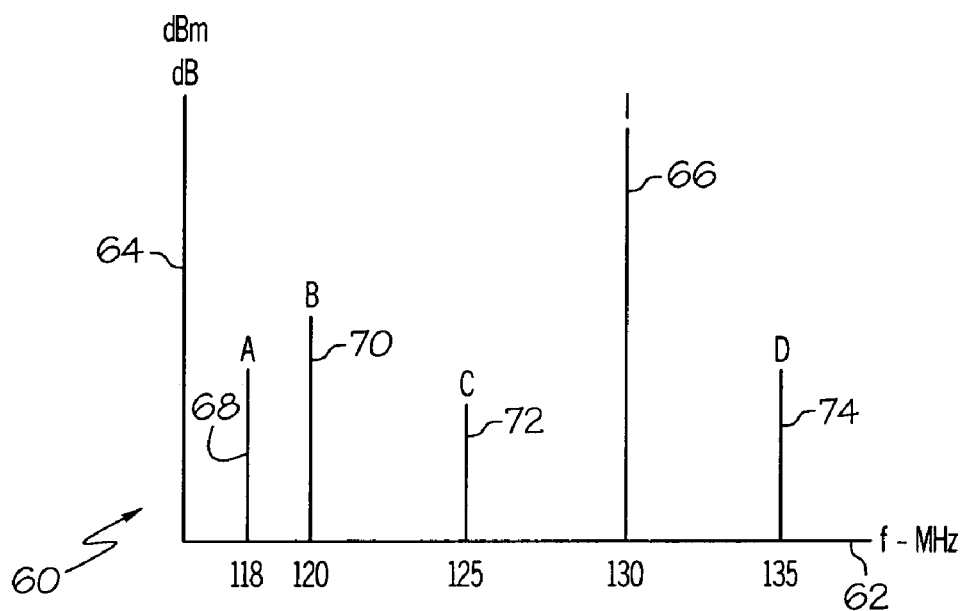
FIG. 3 is a frequency response graph showing example signals received by the radio receiver of FIG. 2.

FIGS. 2–6 illustrate certain limitations of radio transmitter 12 and radio receiver 14 of FIG. 1. In the following example, radio transmitter 12 is transmitting at a frequency of 130 MHz, and radio receiver 14 is receiving at a frequency of 125 MHz. Radio receiver 14 also receives signals from radio transmitters external to aircraft 10 at frequencies of 118 MHz, 120 MHz, 125 MHz and 135 MHz. FIG. 3 shows a frequency graph of these example signals identified as items 68, 70, 72 and 74, respectively.

Figure 4:
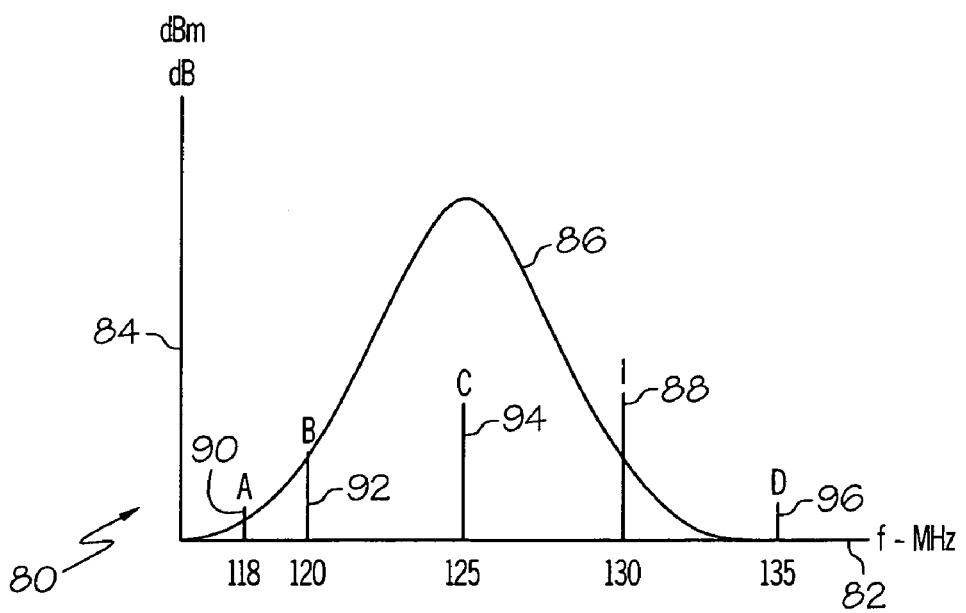
FIG. 4 is a graph showing a frequency response curve for the first narrow band-pass filter of FIG. 2, and example signals.
Figure 5:
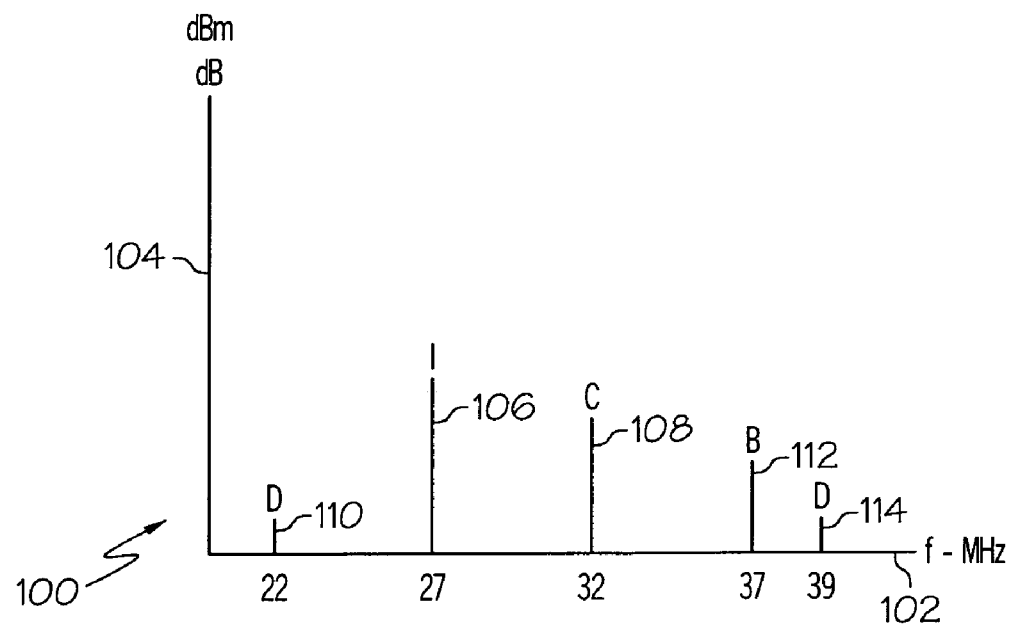
FIG. 5 is a frequency response graph showing frequency content of one signal of FIG. 2.

FIG. 2 is a block diagram illustrating key components of radio receiver 14. Antenna 18 receives radio signal 21 to produce signal 34, an example of which is illustratively shown in FIG. 3. Signal 34 is filtered by narrow band-pass filter 36 to produce signal 38. FIG. 4 shows an exemplary filter response curve 86 for filter 36 and frequency content of signal 38. A user input device 42 is used to select a channel for output by radio receiver 14; the user-selected channel has a frequency of 125 MHz in this example. Filter tuning control 40 is configured, via communication path 42A, to maintain narrow band-pass filter 36 at this frequency. A frequency translator 39 consists of a dynamically controlled local oscillator 44 and a frequency mixer 48. The frequency of dynamically controlled local oscillator 44 is set by user input device 42, via communication path 42B, to produce signal 46 such that when frequency mixer 48 combines signals 38 and 46 to produce a signal 50, the frequency of the user-selected channel is translated into the frequency of fixed frequency narrow band IF filter 52. FIG. 5 is a graph showing frequency content of signal 50, described in more detail below.

Figure 6:
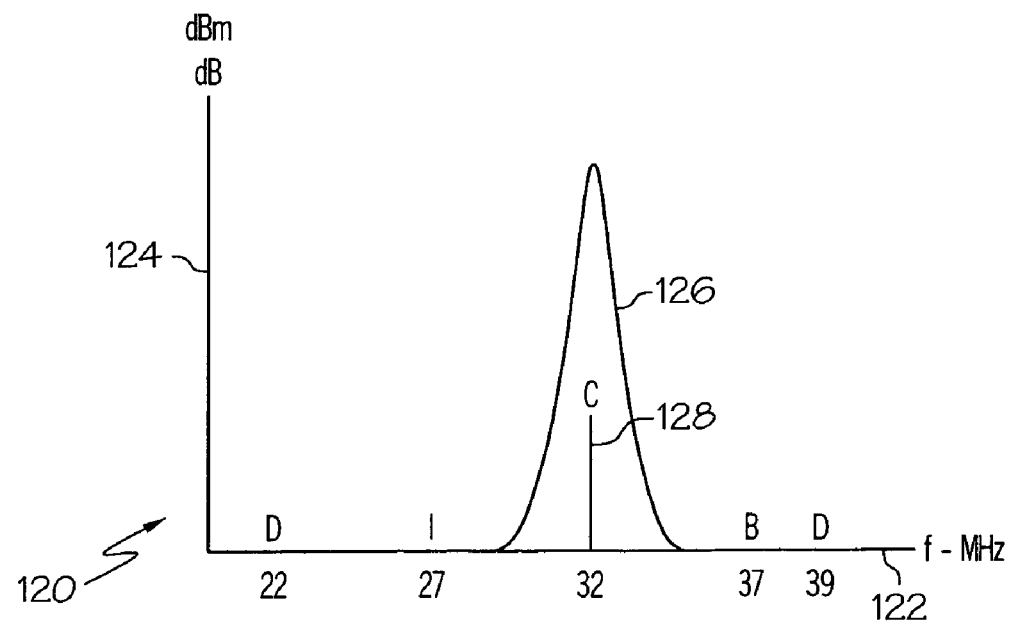
FIG. 6 is a graph showing a frequency response curve for the second narrow band intermediate frequency filter of FIG. 2, and example signals.

Signal 50 is filtered by narrow band IF filter 52 to produce a signal 54. FIG. 6 is a graph showing a frequency response curve 126 for fixed frequency narrow band IF filter 52 and frequency content of signal 54. Demodulator 56 demodulates signal 54 to produce signal 58. Demodulator 56 has, for example, an analog-to-digital conversion process where signal 58 represents a digital data stream.

FIG. 3 shows frequency graph 60 illustrating example radio signals 66, 68, 70, 72 and 74. X-axis 62 represents frequency in MHz, and y-axis 64 represents signal field strength. Signal 66 represents a radio signal received by radio receiver 14 from radio transmitter 12 located on aircraft 10. Signal 66 is shown at a frequency of 130 MHz, and has high signal strength relative to signals 68, 70, 72 and 74. Signals 68, 70, 72 and 74 illustratively represent signals received from external radio transmitters, i.e., not on aircraft 10. Signals 66, 68, 70, 72 and 74 are also labeled "T", "A", "B", "C" and "D", respectively, to facilitate association in following figures. "T" identifies the channel used by radio transmitter 12; "C" identifies the channel selected on radio receiver 14; and "A", "B" and "D" identify other channels containing signals from the radio transmitters external to aircraft 10.

FIG. 4 shows frequency graph 80 where x-axis 82 represents frequency in MHz, and y-axis 84 represents attenuation level for frequency response curve 86 of filter 36 and signal strength for signals 88, 90, 92, 94 and 96; signals 88, 90, 92, 94 and 96 illustratively represent the frequency content of signal 38. Graph 80 shows frequency response curve 86 for narrow band-pass filter 36, which is tuned to the 125 MHz frequency. Signals 90, 92, 88 and 96 have been attenuated by filter 36 to reduce interference with signal 94. Signal 94 has not been attenuated by filter 36 as the frequency of signal 94 is within the frequency range of the user-selected channel. Radio signals received by radio receiver 14 at a frequency close to signal 94 are less attenuated by filter 36, and will therefore generate greater interference than a signal further separated from signal 94.

FIG. 5 shows frequency graph 100 where x-axis 102 represents frequency in MHz, and y-axis 104 represents signal strength. Graph 100 shows signals 106, 108, 110, 112 and 114, which illustratively represent the frequency content of signal 50, FIG. 2. Frequency translator 39 translates the frequency components of signal 38 to an intermediate frequency band. Signal 88 of FIG. 4 has been translated to a frequency of 27 MHz, as indicated by signal 106. Signal 94 of FIG. 4 has been translated to 32 MHz as indicated by signal 108, and signals 90, 92 and 96 of FIG. 4 are translated to frequencies 22 MHz, 37 MHz and 39 MHz, as indicated by signals 110, 112 and 114, respectively. As known by those skilled in the art, frequency mixer 48, FIG. 2, also introduces higher frequency components in signal 50. These components are later removed by narrow band IF filter 52 and are not shown in FIG. 5.

FIG. 6 shows frequency graph 120 where x-axis 122 represents frequency in MHz, and y-axis 124 represents attenuation level for frequency response curve 126 of filter 52, and signal strength for signal 128, where signal 128 represents the frequency content of signal 54. Frequency response curve 126 corresponds to filter 52 tuned to a frequency of 32 MHz as the selected channel. The signals in channels A, B, D and I have been attenuated in this example, leaving only signal 128 in channel C (which is demodulated and output as signal 58, FIG. 2).

As can be appreciated by those skilled in the art, the methods and architecture described in FIGS. 1 to 6 are not suitable for a radio receiver that outputs multiple channels simultaneously. In the prior art, where a radio receiver needs to output a plurality of channels simultaneously, the only method of reducing interference from a radio transmitter on the same aircraft is attenuation of the entire operational frequency band for the duration a transmission. This, however, does not eliminate interference, and reduces the sensitivity of the receiver, resulting in compromised receiver performance.

An Enhanced Radio Receiver

In one embodiment, an enhanced radio receiver receives and outputs a plurality of channels simultaneously. The enhanced radio receiver detects and attenuates a signal with high signal strength without attenuating other received signals.

Figure 7:
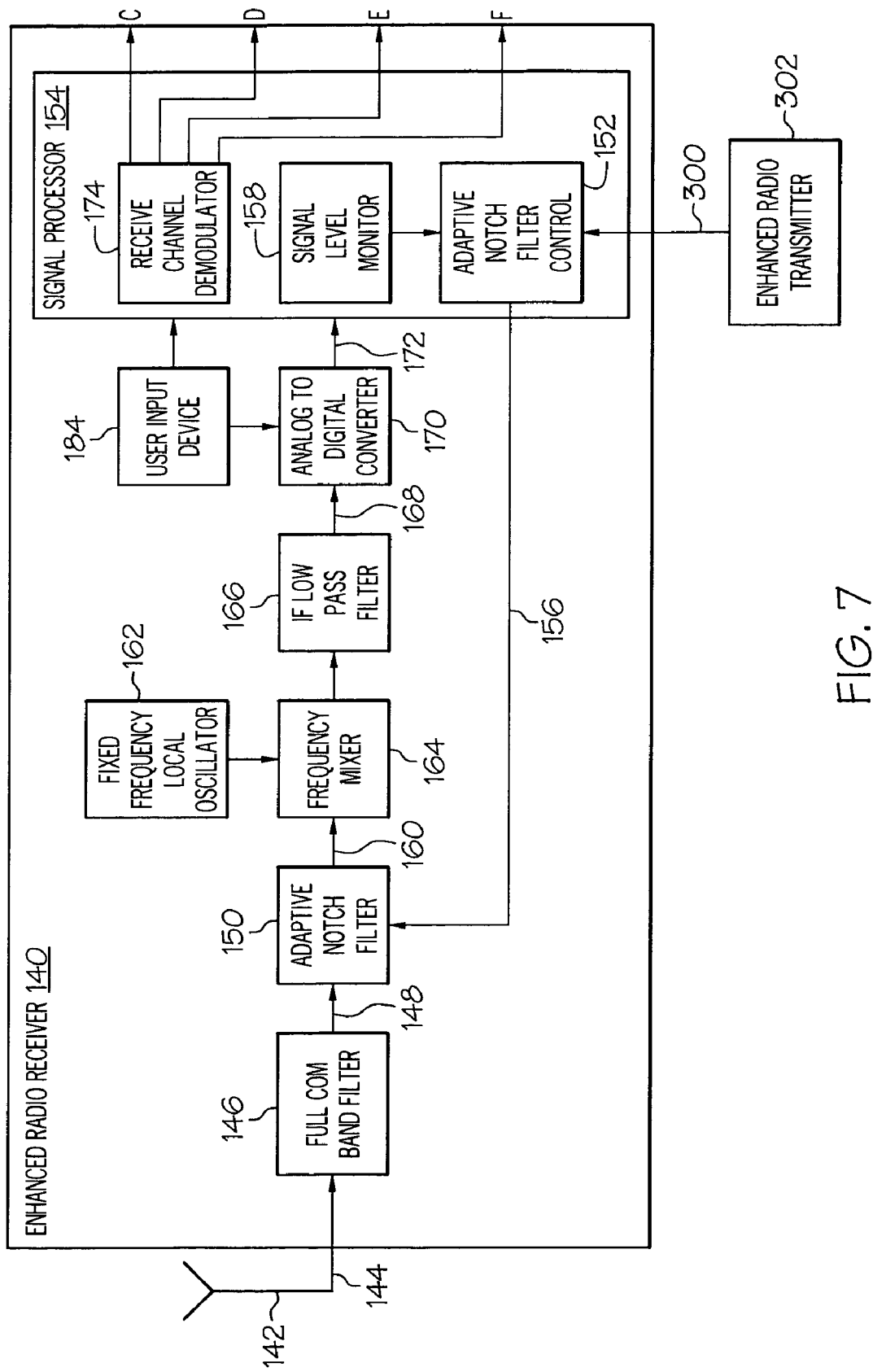
FIG. 7 is a block diagram of one enhanced radio receiver.
Figure 8:
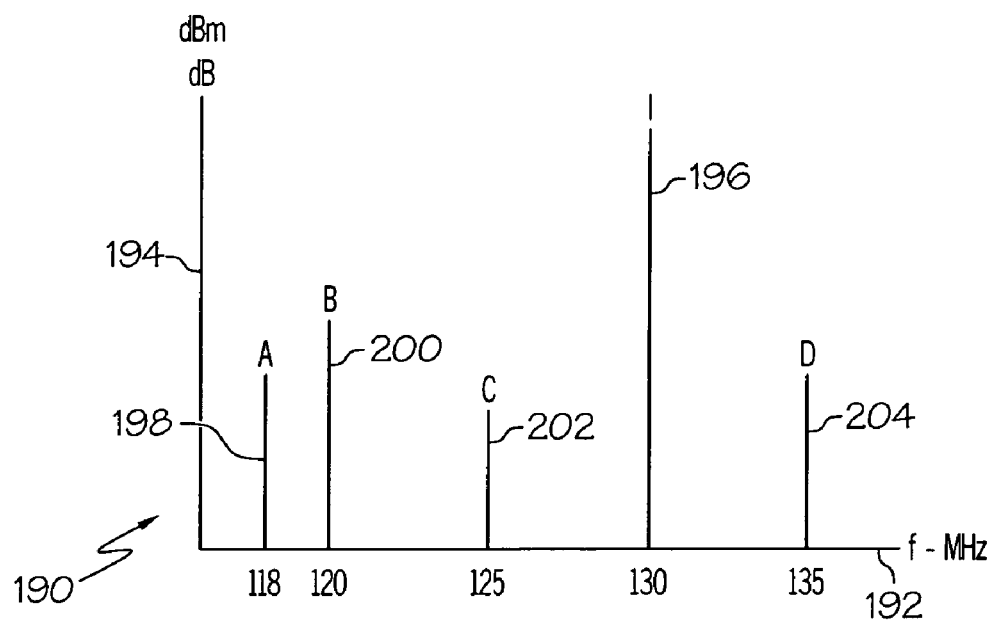
FIG. 8 is a frequency response graph showing example signals received by the enhanced radio receiver of FIG. 7.

FIG. 7 is a block diagram illustrating enhanced radio receiver 140. Enhanced radio receiver 140 replaces and improves radio receiver 14 on aircraft 10, for example. Enhanced radio receiver 140 has an operational frequency band that is equally divided into a plurality of non-overlapping channels. In one illustration, enhanced radio receiver 140 receives and outputs four channels, C, D, E, F, simultaneously. In this example, the frequency content of signal 144 is illustrated in FIG. 8.

Figure 9:
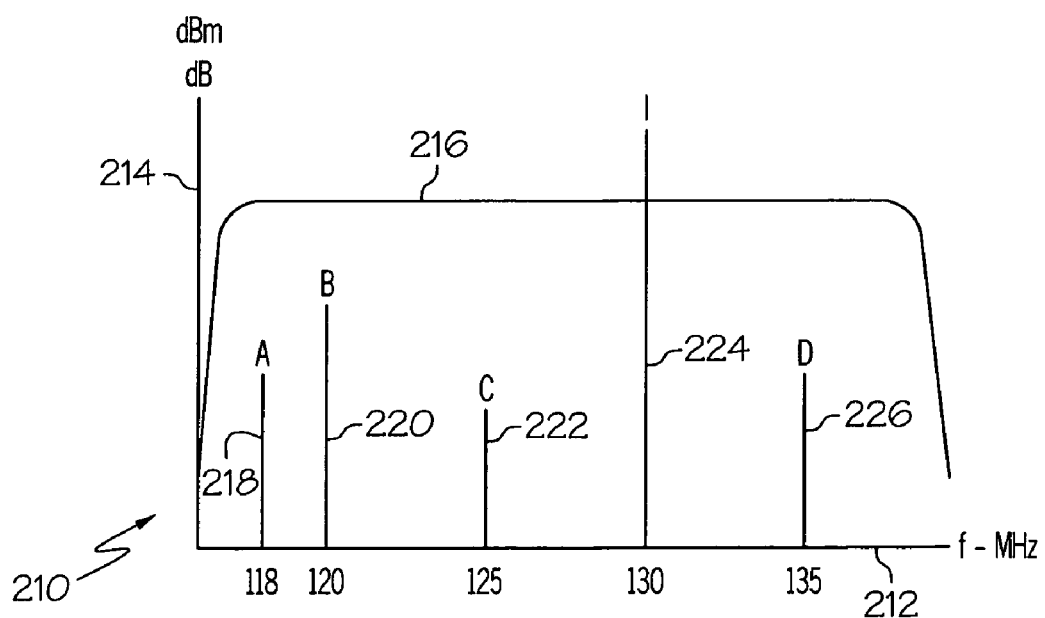
FIG. 9 is a graph showing a frequency response curve of the full COM band filter of FIG. 7, and example signals.

Antenna 142 represents an antenna (e.g., antenna 18 of FIG. 1) located on an aircraft (e.g., aircraft 10 of FIG. 1). Antenna 142 receives radio waves to produce signal 144. Signal 144 is filtered by full COM band filter 146, producing signal 148. FIG. 9 illustrates frequency content of signal 148, and a frequency response curve 216 for filter 146. Adaptive notch filter 150 is controlled by adaptive notch filter control 152 of signal processor 154 via communication path 156; signal processor 154 generates a control signal via path 156 to notch filter 150. Adaptive notch filter 150 selectively attenuates frequencies in a single channel of the operational frequency band. Signal level monitor 158 measures signal levels for all channels simultaneously.

Enhanced radio receiver 140 has a signal level limit that defines a signal strength above which a signal may cause distortion. If a signal exists with a level above this signal level limit, (e.g., when a transmitter on the same aircraft starts transmitting), filter control 152 tunes filter 150 to the frequency of the signal. Since the signal is not completely removed, monitor 158 detects when the signal no longer exists so that filter control 152 turns filter 150 off in restoring sensitivity to that frequency.

Figure 10:
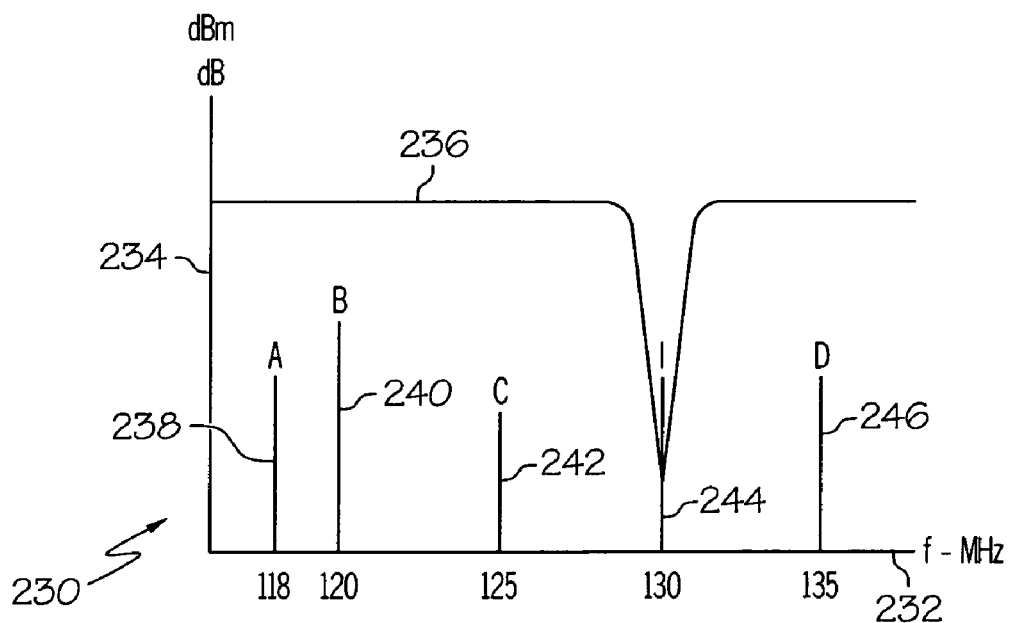
FIG. 10 is a graph showing a frequency response curve for the adaptive notch filter of FIG. 7, and example signals.
Figure 11:
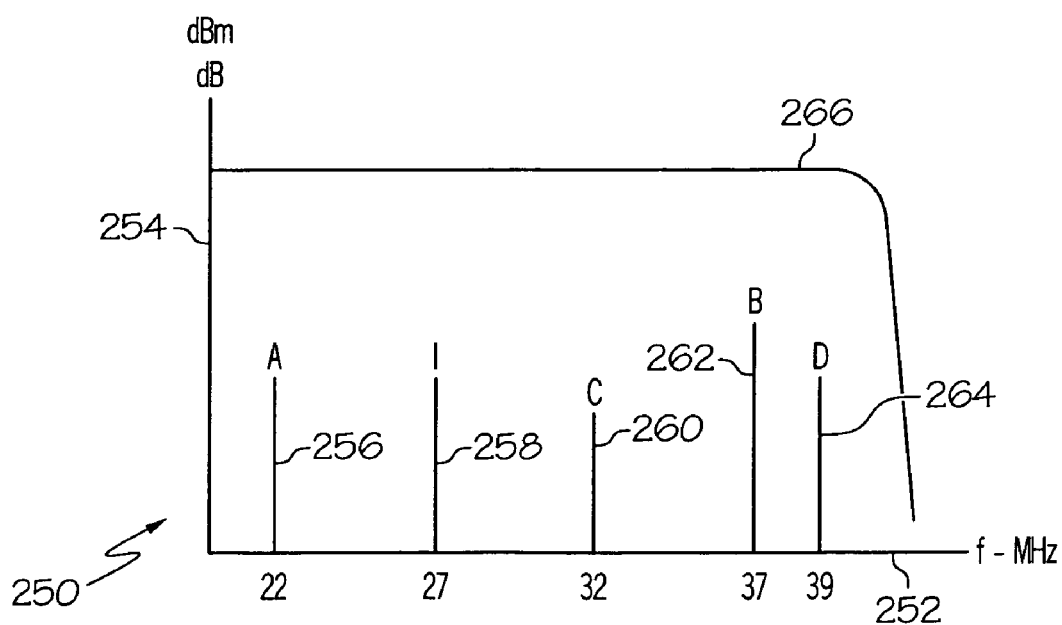
FIG. 11 is a frequency response graph showing a frequency response curve for the IF low pass filter of FIG. 7, and resultant frequency components of the intermediate frequency band signal.

Signal 148 is filtered by filter 150 to produce signal 160. FIG. 10 shows the frequency response curve 236 of filter 150 and resulting frequency content of signal 160. Local oscillator 162, frequency mixer 164 and IF low pass filter 166 translate signal 160 into signal 168. FIG. 11 illustrates the frequency content of signal 168 and a frequency response curve of IF low pass filter 166. Analog-to-digital converter 170 is used to convert signal 168 into a digital data stream 172 for processing by signal processor 154. User input device 184 allows a pilot to select channels for output by enhanced radio receiver 140. Receive channel demodulator 174 selectively demodulates the signals in the selected channels, producing outputs C, D, E and F, in one example.

FIG. 8 shows frequency graph 190 illustrating example radio signals 196, 198, 200, 202 and 204. X-axis 192 represents frequency in MHz, and y-axis 194 represents signal field strength. Signal 196 represents a radio signal received by enhanced radio receiver 140 from radio transmitter 12 located on aircraft 10. Signal 196 is shown at a frequency of 130 MHz, and has high signal strength relative to signals 198, 200, 202 and 204. Signals 198, 200, 202 and 204 illustratively represent signals received from external radio transmitters, i.e., transmissions not on aircraft 10. Signals 196, 198, 200, 202 and 204 are also labeled "I", "A", "B", "C" and "D", respectively, to facilitate association in following figures. "I" identifies the channel used by radio transmitter 12; "C" identifies the channel selected on enhanced radio receiver 140; and "A", "B" and "D" identify other channels containing signals from radio transmitters external to aircraft 10.

FIG. 9 shows frequency graph 210 where x-axis 212 represents frequency in MHz, and y-axis 214 represents attenuation for frequency response curve 216 of filter 146, FIG. 7, and signal strength for signals 218, 220, 222, 224 and 226, which represent the frequency components of signal 148. Frequency response curve 216 illustrates that filter 146 does not attenuate frequencies between 118 MHz and 137 MHz (the operational frequency band of enhanced radio receiver 140, FIG. 7, in this example), while frequencies outside this band are attenuated. Signals 196, 198, 200, 202 and 204 are within the operational frequency band of enhanced radio receiver 140 and are therefore not attenuated by filter 146.

FIG. 10 shows a frequency graph 230 where x-axis 232 represents frequency in MHz, and y-axis 234 represents attenuation for frequency response curve 236 of filter 150, FIG. 7, and signal strength for signals 238, 240, 242, 244 and 246, which represent the frequency content of signal 160, FIG. 7. In the example, adaptive notch filter control 152, FIG. 7, has tuned adaptive notch filter 150 to 130 MHz. Adaptive notch filter 150 attenuates frequencies within one channel; thus signal 244 is shown attenuated by filter 150, while signals 238, 240, 242 and 246 are not attenuated. This reduces interference from signal 196, without affecting sensitivity of other channels in the operation frequency band of enhanced radio receiver 140.

FIG. 11 shows a frequency graph 250 where x-axis 252 represents frequency in MHz, and y-axis 254 represents signal strength for signals 256, 258, 260, 262 and 264, representing the frequency content of signal 168, and attenuation for frequency response curve 266, which represents the attenuation response if IF low pass filter 166. Graph 250 shows the frequency content of signal 168, FIG. 7, after frequency mixer 164 has transposed signal 160 to the IF band and after it has been filtered by IF low pass filter 166. Frequency response curve 266 shows that IF low pass filter 166 does not attenuate in-band signals.

It should be noted that signal 262 has been selectively attenuated by adaptive notch filter 150, while other signals, 256, 258, 260, and 264 have not. Thus, enhanced radio receiver 140 has selectively reduced interference from signal 262 and can output multiple channels, C, D, E, F, simultaneously.

Figure 12:
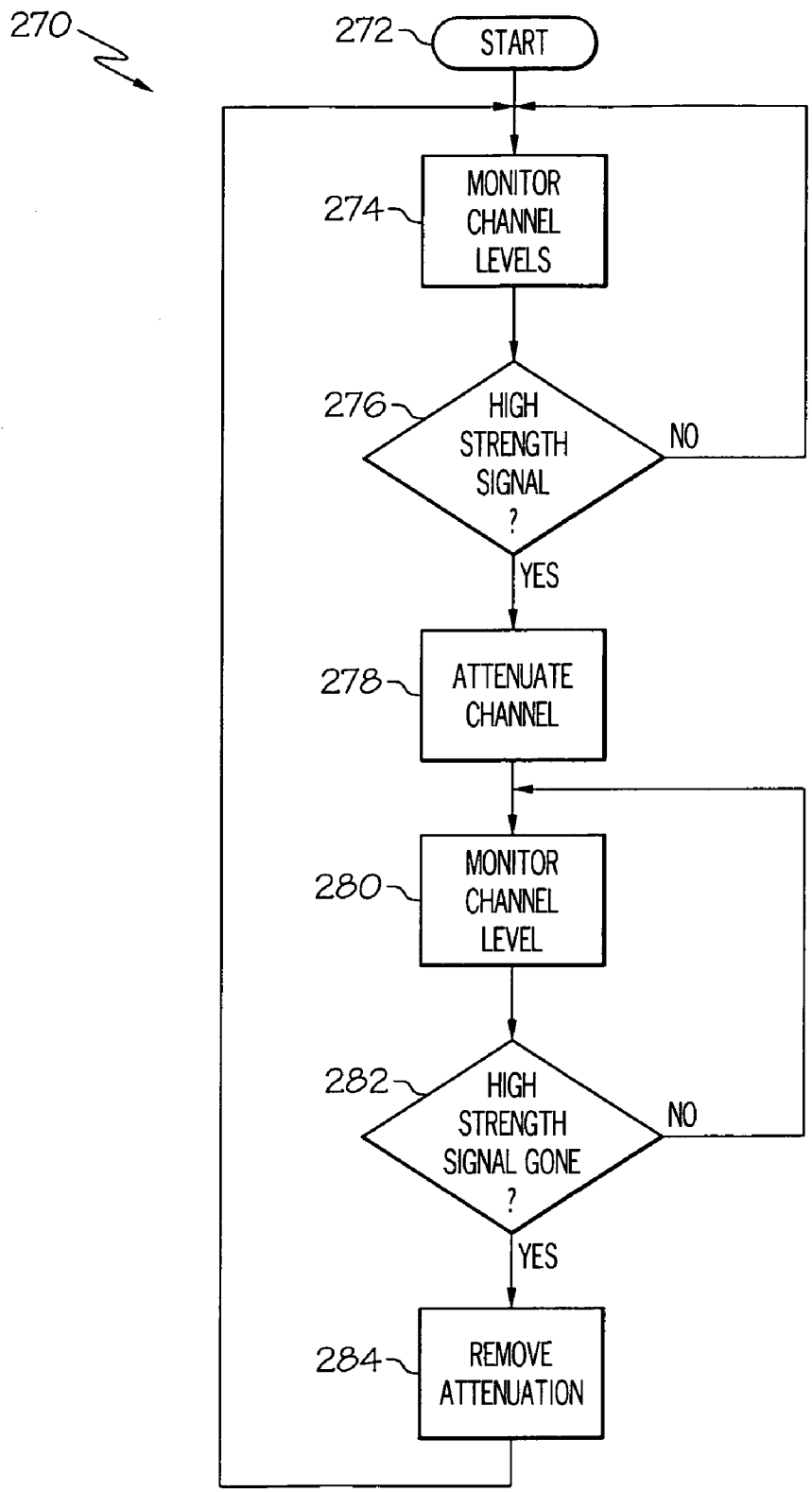
FIG. 12 is a flow chart illustrating one process for controlling one enhanced radio receiver.

FIG. 12 is a flow chart illustrating one process 270 for controlling enhanced radio receiver 140 to dynamically detect and attenuate high-level signals using adaptive notch filter 150, FIG. 7. Process 270 starts at step 272, and continues with step 274.

Step 274 monitors the signal level in all channels in the operational frequency band of enhanced radio receiver 140, FIG. 7, using signal level monitor 158, FIG. 7. Process 270 continues with step 276.

Step 276 is a decision. If a signal has a level greater than the signal level limit, process 270 continues with step 278; otherwise process 270 continues with step 274.

Step 278 uses adaptive notch filter control 152 to control adaptive notch filter 150 to attenuate the signal detected in step 276. Process 270 continues with step 280.

Step 280 monitors the signal level of the high level signal detected in step 276. Process 270 continues with step 282.

Step 282 is a decision. If the signal level measured in step 280 indicates that the high level signal detected in step 276 no longer exists, process 270 continues with step 284; otherwise process 270 continues with step 280.

Step 284 uses adaptive notch filter control 152 to disable notch filter 150, thus removing the attenuation at the frequency of the high level signal detected in step 276. Process 270 continues with step 274.

In one embodiment, and as shown in FIG. 7, a data communication path 300 exists between an enhanced radio receiver 140 and an enhanced transmitter 302, to inform enhanced radio receiver 140 of the frequency of transmission. Enhanced radio receiver 140 therefore does not need to detect the transmission frequency to be able to attenuate the transmission. Enhanced radio receiver 140 complexity is thereby reduced since element 158, FIG. 7, is not used.

In another embodiment, IF low pass filter 166 is replaced with an adaptive notch filter that is also controlled by adaptive notch filter control 152, to attenuate a strong signal from a radio transmitter (e.g., radio transmitter 12, FIG. 1) in the intermediate frequency band.

In yet another embodiment, adaptive notch filter 150, of FIG. 7, is omitted and IF low pass filter 166 is replaced with an adaptive notch filter controlled by adaptive notch filter control 152, to attenuate a strong signal from a radio transmitter (e.g., radio transmitter 12, FIG. 1) in the intermediate frequency band.

Those skilled in the art will appreciate that variations from the specified embodiments disclosed above are contemplated herein. The description should not be restricted to the above embodiments, but should be measured by the following claims.

What is claimed is:

1. A system for reducing radio interference between a radio transmitter and a radio receiver located in a common aircraft and operating in a common radio frequency band, comprising:
   an analog-to-digital converter for converting signals representative of the common radio frequency band to a digital data stream;
   a signal processor for (a) processing the digital data stream to detect presence of a first radio signal, within the common radio frequency band and from the radio transmitter, (b) generating a control signal indicative of the first radio signal, and (c) demodulating one or more second radio signals from the radio receiver for output as one or more user selected channels; and
   an adaptive notch filter responsive to the control signal for attenuating the first radio signal to reduce interference between the first radio signal and the output.

2. A system of claim 1, the signal processor comprising a signal level monitor for measuring signal levels within the digital data stream to determine non-existence of the first radio signal.

3. A system of claim 1, the signal processor comprising a receive channel demodulator for demodulating the one or more second radio signals simultaneously.

4. A system of claim 1, the signal processor comprising an adaptive notch filter control for generating the control signal.

5. A system of claim 1, further comprising a full communications band filter for filtering analog signals input to the radio receiver to the common radio frequency band.

6. A system of claim 1, further comprising a local oscillator, frequency mixer and IF low pass filter, the local oscillator, frequency mixer and IF low pass filter cooperating to generate an intermediate frequency band from the common radio frequency band, the analog-to-digital converter being constructed and arranged to process the intermediate frequency band to convert the signals to the digital data stream.

7. A system of claim 1, further comprising a data communication path for connecting between the radio transmitter and the radio receiver, the radio transmitter communicating frequency of the first radio signal to the signal processor, the control signal indicating the frequency for input to the adaptive notch filter.

8. A system of claims 1 or 7, further comprising the radio transmitter and the radio receiver.

9. An enhanced radio receiver for reducing interference from an on-board radio transmitter operating in a like frequency band, comprising:
   an analog-to-digital converter for converting signals representative of the frequency band to a digital data stream;
   a signal processor for (a) processing the digital data stream to detect presence of a first radio signal, within the frequency band and from the radio transmitter, (b) generating a control signal indicative of the first radio signal, and (c) demodulating one or more received radio signals for output as one or more user selected channels; and
   an adaptive notch filter responsive to the control signal for attenuating the first radio signal to reduce interference between the first radio signal and the output.

10. An enhanced radio receiver of claim 9, the signal processor comprising a signal level monitor for measuring signal levels within the digital data stream to determine non-existence of the first radio signal.

11. An enhanced radio receiver of claim 9, the signal processor comprising a receive channel demodulator for demodulating the one or more received radio signals simultaneously.

12. An enhanced radio receiver of claim 9, the signal processor comprising an adaptive notch filter control for generating the control signal.

13. An enhanced radio receiver of claim 9, further comprising a full communication band filter for filtering antenna signals to the frequency band.

14. An enhanced radio receiver of claim 9, further comprising a local oscillator, frequency mixer and IF low pass filter, the local oscillator, frequency mixer and IF low pass filter cooperating to generate an intermediate frequency band from the frequency band, the analog-to-digital converter being constructed and arranged to process the intermediate frequency band to convert the signals to the digital data stream.

15. A method of reducing interference between a radio receiver and a radio transmitter located in the same aircraft and operating in a common frequency band, comprising the steps of:
   monitoring signal levels within the frequency band;
   detecting a first radio signal from the transmitter; and
   tuning a notch filter within the radio receiver to attenuate the first radio signal during transmission of the first radio signal to reduce interference with one or more second radio signals output by the radio receiver.

16. A method of claim 15, the steps of monitoring and detecting comprising the steps of translating the frequency band into an intermediate frequency band, converting the intermediate frequency band into a digital data stream, and digitally processing the digital data stream to detect the first radio signal.

17. A method of claim 16, further comprising the step of digitally processing the digital data stream to demodulate and output the second radio signals with reduced interference by the first radio signal.

18. A method of reducing interference between a radio receiver and a radio transmitter located in the same aircraft and operating in a common frequency band, comprising the steps of:
   communicating a transmission frequency from the radio transmitter to the radio receiver, the transmission frequency corresponding to a first radio signal generated by the radio transmitter; and
   tuning a notch filter within the radio receiver to attenuate the first radio signal during transmission of the first radio signal to reduce interference with one or more second radio signals demodulated and output by the radio receiver.

19. A system for reducing radio interference between a radio transmitter and a radio receiver located in a common aircraft and operating in a common radio frequency band, comprising:
   a fixed frequency local oscillator and a frequency mixer cooperating to convert the common radio frequency band into an intermediate frequency band;
   an analog-to-digital converter for converting the intermediate frequency band to a digital data stream;
   a signal processor for (a) processing the digital data stream to detect presence of a first radio signal, within the common radio frequency band and from the radio transmitter, (b) generating a control signal indicative of the first radio signal, and (c) demodulating one or more second radio signals from the radio receiver for output as one or more user selected channels; and first and second adaptive notch filters, the first adaptive notch filter filtering the common radio frequency band and the second adaptive notch filter filtering the intermediate frequency band, the first and second adaptive notch filters being responsive to the control signal for attenuating the first radio signal to reduce interference between the first radio signal and the output.

20. A system for reducing radio interference between a radio transmitter and a radio receiver located in a common aircraft and operating in a common radio frequency band, comprising: a fixed frequency local oscillator and a frequency mixer cooperating to convert the common radio frequency band into an intermediate frequency band;

an analog-to-digital converter for converting the intermediate frequency band to a digital data stream;

an analog-to-digital converter for converting the intermediate frequency band to a digital data stream; a signal processor for (a) processing the digital data stream to detect presence of a first radio signal, within the common radio frequency band and from the radio transmitter, (b) generating a control signal indicative of the first radio signal, and (c) demodulating one or more second radio signals from the radio receiver for output as one or more user selected channels; and an adaptive notch filter for filtering the intermediate frequency band, the adaptive notch filter being responsive to the control signal for attenuating the first radio signal to reduce interference between the first radio signal and the output.

* * * * *